US012787927B2

(12) United States Patent
Zhang et al.

(10) Patent No.: US 12,787,927 B2
(45) Date of Patent: Nov. 10, 2026

(54) HEADER CLUTCH SLIP DETECTION

(71) Applicant: Deere & Company, Moline, IL (US)

(72) Inventors: Haifeng Zhang, West Fargo, ND (US); Jason A. Jelinek, Fargo, ND (US); David M. Thompson, Pelican Rapids, MN (US); Hector Alonso Gonzalez Miranda, Monterrey (MX); Scott E. Faulkner, Orion, IL (US); Troy M. Heims, Davenport, IA (US); Mitchel J. Lindberg, Geneseo, IL (US); Jeremy J. Zeltinger, Valley City, ND (US); Spencer J. Harwood, Fargo, ND (US); Francisco De Borja Lobato, Las Rozas (ES)

(73) Assignee: Deere & Company, Moline, IL (US)

( * ) Notice: Subject to any disclaimer, the term of this patent is extended or adjusted under 35 U.S.C. 154(b) by 334 days.

(21) Appl. No.: 18/585,841

(22) Filed: Feb. 23, 2024

(65) Prior Publication Data

US 2025/0268136 A1 Aug. 28, 2025

(51) Int. Cl.
*A01D 41/127* (2006.01)
*A01D 41/14* (2006.01)
(Continued)

(52) U.S. Cl.
CPC ......... *A01D 41/127* (2013.01); *A01D 45/021* (2013.01); *A01D 69/08* (2013.01); *G07C 5/0808* (2013.01); *A01D 41/141* (2013.01)

(58) Field of Classification Search
CPC .. A01D 41/127; A01D 41/141; A01D 45/021; A01D 69/08; G07C 5/0808
(Continued)

(56) References Cited

U.S. PATENT DOCUMENTS 6,053,047 A * 4/2000 Dister ................. G01M 13/028 73/660
7,739,861 B2 6/2010 Mackin
(Continued)

OTHER PUBLICATIONS

Vaseghi, Saeed, "Advanced Digital Signal Processing and Noise Reduction, 3rd Edition", ISBN: 978-0-470-09495-2 (Year: 2006).*
(Continued)

*Primary Examiner* — Krishnan Ramesh
(74) *Attorney, Agent, or Firm* — Christopher J. Volkmann; KELLY, HOLT & CHRISTENSON PLLC

(57) ABSTRACT

A vibration sensor is mounted to a corn head of an agricultural harvester. The vibration sensor generates a sensor signal indicative of sensed vibrations on the corn head. The sensor signal is converted to a digital signal and a bandpass filter is applied to filter out signals in frequency ranges that do not represent slip clutch impulses. The filtered signal is demodulated to better identify the slip impulses generated when the slip clutch is slipping. The demodulated signal is transformed to a frequency domain signal and an input frequency is calculated based upon the speed of rotation of the drive shaft (or an expected range of speeds), the slip clutch configuration, and a gear ratio of a gear box between the drive shaft and the slip clutch. The power in parts of the frequency domain signal that are within a desired range of the input frequency is compared to a threshold power value to determine whether a slip clutch is slipping. A slip status signal, indicative of whether a slip clutch is slipping, is output. A control signal is generated based upon the slip status.

20 Claims, 10 Drawing Sheets

(51) Int. Cl.
*A01D 45/02* (2006.01)
*A01D 69/08* (2006.01)
*G07C 5/08* (2006.01)

(58) Field of Classification Search
USPC .......................................................... 701/50
See application file for complete search history.

(56) References Cited

U.S. PATENT DOCUMENTS

| | | | | |
|---|---|---|---|---|
| 8,190,338 | B2 * | 5/2012 | Commuri | E01C 19/288 701/50 |
| 10,064,332 | B1 | 9/2018 | Ohms et al. | |
| 11,117,578 | B1 * | 9/2021 | Park | B60W 50/14 |
| 11,161,494 | B2 | 11/2021 | Brammeier et al. | |
| 2009/0192734 | A1 * | 7/2009 | Mackin | A01D 45/021 702/56 |
| 2018/0249631 | A1 * | 9/2018 | Ohms | A01D 82/00 |
| 2019/0332958 | A1 * | 10/2019 | Subhankar | G01N 29/4454 |
| 2021/0125428 | A1 * | 4/2021 | Tedesco | B60C 23/20 |

OTHER PUBLICATIONS

AF Series Combines. Product Brochure [online]. CNH Industrial America LLC., 2023 [retrieved on Feb. 19, 2024]. Retrieved from the intemet: https://www.caseih.com/en-us/unitedstates/products/harvesting/af-series, 5 pages.

AF Series Combines. Product Brochure [online]. CNH Industrial America L.L.C., 2023 [retrieved on Feb. 19, 2024]. Retrieved from the internet: https://www.caseih.com/en-us/unitedstates/products/harvesting/af-series, 5 pages.

* cited by examiner

HEADER CLUTCH SLIP DETECTION

FIELD OF THE DESCRIPTION

The present description relates to headers on combine harvesters. More specifically, the present description relates to detecting clutch slip on a header of a combine harvester.

BACKGROUND

Agricultural harvesters are currently in wide use. Agricultural harvesters often have a head (also referred to as a header) that is used to engage crops in a field and feed that crop into harvesting functionality within the agricultural harvester.

For example, an agricultural harvester may have a corn head that is used to engage corn crop in the field. The corn head may have a plurality of snouts or shrouds that are used to divide the corn rows and guide each row into a different row unit for processing the corn crop. Each row unit may have row unit equipment, such as gathering chains that guide the corn stalks into the row unit, snap rolls that remove the ears from the stalks, and choppers that are used to chop the corn stalks and other residue once the ears of corn are removed. The corn head also has an auger that gathers the ears of corn toward a central portion of the corn head and a conveyor that moves the crop rearward from the header into a feeder house that feeds the harvested crop back into the additional harvesting functionality that is supported by the agricultural harvester. One or more drive shafts that are often driven by a power takeoff on the agricultural harvester drive the auger and the row unit equipment through one or more different gear boxes.

During operation, the combine harvester advances through a field and the row units engage crop and begin processing that crop by severing the stalks, removing the ears from the stalks, chopping the stalks, and gathering the ears into the feeder house of the agricultural harvester, for further processing. It is not uncommon for the row unit equipment to become jammed with an excess of crop residue or other foreign material. When jammed, the row unit equipment stops operating.

Therefore, in order to protect the combine harvester, the header, and the row unit equipment, a slip clutch is used to connect the row unit equipment to the drive shaft. Therefore, when any of the row unit equipment or the chopper becomes jammed, the slip clutch begins to slip so that equipment is disengaged from the drive shaft by the slip clutch. This disengagement permits the drive shaft to continue rotating even though the row unit equipment or chopper is jammed, and is not operating.

The discussion above is merely provided for general background information and is not intended to be used as an aid in determining the scope of the claimed subject matter.

SUMMARY

A vibration sensor is mounted to a corn head of an agricultural harvester. The vibration sensor generates a sensor signal indicative of sensed vibrations on the corn head. The sensor signal is converted to a digital signal and a bandpass filter is applied to filter out signals in frequency ranges that do not represent slip clutch impulses. The filtered signal is demodulated to better identify the slip impulses generated when the slip clutch is slipping. The demodulated signal is transformed to a frequency domain signal and an input frequency is calculated based upon the speed of rotation of the drive shaft (or an expected range of speeds), the slip clutch configuration, and a gear ratio of a gear box between the drive shaft and the slip clutch. The power in parts of the frequency domain signal that are within a desired range of the input frequency is compared to a threshold power value to determine whether a slip clutch is slipping. A slip status signal, indicative of whether a slip clutch is slipping, is output. A control signal is generated based upon the slip status.

Example 1 is a computer implemented method, comprising:

- receiving a sensor signal from a vibration sensor mounted on a frame of an agricultural header that has a drive shaft that transmits power to a row unit through a slip clutch;
- converting the sensor signal to a digital signal;
- applying a bandpass filter to the digital signal to obtain a filtered signal;
- demodulating the filtered signal to obtain a demodulated signal;
- transforming the demodulated signal to a frequency domain signal;
- obtaining an input frequency value indicative of a frequency at which vibrations are induced on the frame of the agricultural header when the slip clutch is slipping;
- comparing a power of the frequency domain signal, within a range of the input frequency, to a threshold power value to obtain a comparison result; and
- generating a slip status output indicative of whether the slip clutch is slipping based on the comparison result.

Example 2 is the computer implemented method of any or all previous examples wherein obtaining an input frequency comprises:

- sensing a speed of rotation of the drive shaft; and
- computing the input frequency based on the sensed speed of rotation of the drive shaft.

Example 3 is the computer implemented method of any or all previous examples wherein obtaining an input frequency comprises:

- obtaining a slip clutch configuration indicator indicative of a configuration of the slip clutch; and
- computing the input frequency based on the configuration of the slip clutch.

Example 4 is the computer implemented method of any or all previous examples wherein the slip clutch has a physical configuration that determines a rate at which vibrations are induced on the frame when the slip clutch is slipping, given a frequency of rotation of the drive shaft, and wherein obtaining a slip clutch configuration comprises:

- obtaining the physical configuration of the slip clutch.

Example 5 is the computer implemented method of any or all previous examples wherein the drive shaft transmits power to the row unit through a gear assembly having a gear ratio and wherein obtaining an input frequency comprises:

- computing the input frequency based on the gear ratio of the gear assembly.

Example 6 is the computer implemented method of any or all previous examples wherein obtaining an input frequency comprises:

- obtaining an expected range of speeds of rotation of the drive shaft; and
- computing a set of input frequencies based on the expected range of speeds of rotation of the drive shaft.

Example 7 is the computer implemented method of any or all previous examples wherein comparing a power of the frequency domain signal to a threshold power value to obtain a comparison result comprises:

comparing a power of the frequency domain signal, within a range of the set of input frequencies, to a threshold power value to obtain the comparison result.

Example 8 is the computer implemented method of any or all previous examples and further comprising:

determining validity of the slip status output based on a validity criterion; and generating a control signal based on the validity of the slip status output.

Example 9 is the computer implemented method of any or all previous examples wherein determining validity of the slip status output comprises:

detecting a characteristic of engagement of the drive shaft; and determining the validity of the slip status output based on the characteristic of engagement of the drive shaft.

Example 10 is the computer implemented method of any or all previous examples wherein generating a control signal comprises:

generating the control signal to control an operator interface based on the slip status output.

Example 11 is the computer implemented method of any or all previous examples wherein generating a control signal comprises:

generating the control signal to control header functionality or harvester functionality based on the slip status output.

Example 12 is an agricultural system, comprising:

an agricultural harvester;

a header coupled to the agricultural harvester, the header having a frame, a drive shaft, a plurality of row units, and a plurality of slip clutches, the drive shaft being configured to transmit power to each row unit, of the plurality of row units, through a separate slip clutch, of the plurality of slip clutches;

a vibration sensor mounted on the frame of the header, configured to generate a sensor signal indicative of sensed vibrations;

a signal processing system configured to convert the sensor signal to a digital signal, bandpass filter the digital signal to obtain a filtered signal, demodulate the filtered signal to obtain a demodulated signal, and transform the demodulated signal to a frequency domain signal;

an input frequency calculation processor configured to obtain an input frequency value indicative of a frequency at which vibrations occur on the frame of the header when a slip clutch, of the plurality of slip clutches, is slipping;

a threshold comparison processor configured to compare a power of the frequency domain signal, within a range of the input frequency, to a threshold power value to obtain a comparison result; and a slip status output system configured to generate a slip status output indicative of whether the slip clutch, of the plurality of slip clutches, is slipping based on the comparison result.

Example 13 is the agricultural system of any or all previous examples and further comprising:

a drive shaft speed sensor configured to sense a speed of rotation of the drive shaft, the input frequency calculation processor being configured to compute the input frequency based on the sensed speed of rotation of the drive shaft.

Example 14 is the agricultural system of any or all previous examples wherein the input frequency calculation processor is configured to obtain a slip clutch configuration indicator indicative of a configuration of the slip clutch and compute the input frequency based on the configuration of the slip clutch.

Example 15 is the agricultural system of any or all previous examples wherein the slip clutch, of the plurality of slip clutches, has a physical configuration that determines a rate at which vibrations are produced on the frame when the slip clutch is slipping, given a frequency of rotation of the drive shaft, and wherein the input frequency calculation processor is configured to compute the input frequency based on the physical configuration of the slip clutch.

Example 16 is the agricultural system of any or all previous examples and further comprising:

a gear assembly, having a gear ratio, coupled to transmit power from the drive shaft to the row unit the input frequency calculation processor being configured to compute the input frequency based on the gear ratio of the gear assembly.

Example 17 is the agricultural system of any or all previous examples and further comprising:

an interlock processor configured to determine a validity of the slip status output based on a validity criterion; and a control signal generator configured to generate a control signal based on the validity of the slip status output.

Example 18 is an agricultural system, comprising:

an agricultural harvester;

a header coupled to the agricultural harvester, the header having a frame, a drive shaft, a plurality of row units, and a plurality of slip clutches, the drive shaft being configured to transmit power to each row unit, of the plurality of row units, through a separate slip clutch, of the plurality of slip clutches;

a vibration sensor mounted on the frame of the header, configured to generate a sensor signal indicative of sensed vibrations;

a signal processing system configured to convert the sensor signal to a digital signal, bandpass filter the digital signal to obtain a filtered signal, demodulate the filtered signal to obtain a demodulated signal, and transform the demodulated signal to a frequency domain signal;

a slip detection system configured to generate a slip status output indicative of whether the slip clutch, of the plurality of slip clutches, is slipping based on the frequency domain signal.

Example 19 is the agricultural system of any or all previous examples wherein the slip detection system comprises:

an input frequency calculation processor configured to obtain an input frequency value indicative of a frequency at which vibrations occur on the frame of the header when a slip clutch, of the plurality of slip clutches, is slipping.

Example 20 is the agricultural system of any or all previous examples wherein the slip detection system comprises:

a threshold comparison processor configured to compare a power of the frequency domain signal, within a range of the input frequency, to a threshold power value to obtain a comparison result; and a slip status output system configured to generate the slip status output based on the comparison result.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
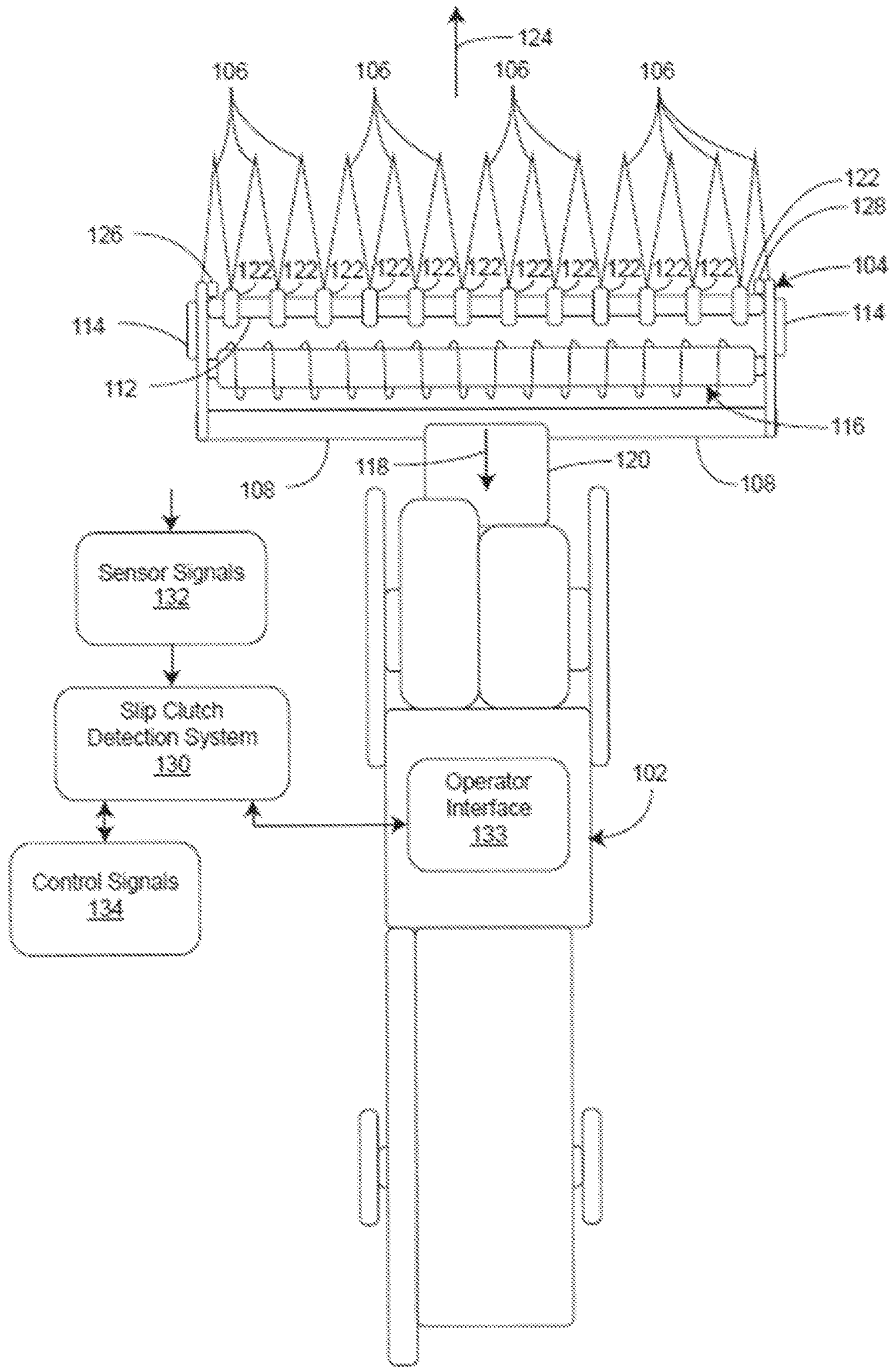
FIG. 1 is a pictorial illustration of an agricultural system including an agricultural harvester with a corn head.

As discussed above, it is not uncommon for an agricultural harvester corn head to have row units with row unit equipment that becomes jammed and that ceases to operate. Therefore, slip clutches are provided between the drive shaft that transmits power to the row unit equipment and each of the row units. Thus, when a row unit becomes jammed, the slip clutch for that row unit begins to slip so the drive shaft can continue to rotate even though the row unit equipment does not continue to operate. The jammed row unit equipment is thus isolated from the drive shaft by the slip clutch. This helps to protect both the agricultural harvester and the row unit equipment from damage. Also, this allows the other row units which are not jammed to continue to operate.

However, it is undesirable to allow a slip clutch to continue to slip for a lengthy period of time. A slipping slip clutch causes increased heat and additional wear on the slip clutch. This can result in damage to the slip clutch itself in as little as a few minutes time. Further, while the slip clutch is slipping, the corresponding row unit is not operating. Therefore, if the harvester continues advancing along the field, the row that is intended to be harvested by the jammed row unit will not be harvested, thus leaving unharvested crop in the field.

This problem can be exacerbated because an operator of the agricultural harvester often cannot see that a clutch is slipping. Further, in autonomous scenarios, there may not even be a human operator in the agricultural harvester, making clutch slip detection even more difficult.

Some current systems have attempted to perform automatic clutch slip detection by sensing vibrations on the corn head, performing an analog to digital conversion on the sensor signal and running that signal through a bandpass filter. The magnitude of the amplitude of the filtered signal is compared against a threshold value to determine whether a clutch slip is occurring. However, this can lead to erroneous slip detection. For instance, the parameters of the bandpass filter are dependent on the frequency of rotation of the drive shaft. Thus, the parameters of the bandpass filter must vary with the frequency of rotation of the drive shaft, or the proper frequency band will not be passed through the filter. Similarly, the amplitude modulated nature of the current slip clutch detectors can have reduced accuracy when other components of the header, or terrain, are inducing vibrations.

The present discussion thus proceeds with respect to a slip clutch detection system that senses vibrations on the header, performs bandpass filtering and then demodulates the filtered signal to better capture clutch slip impulses. A Fast Fourier Transformation is performed on the demodulated signal to transform the signal into the frequency domain. Regardless of whether the drive shaft speed is known, an input frequency is calculated based upon either the known drive shaft speed or a range of expected drive shaft speeds, based upon the slip clutch configuration, and based upon a gear ratio that is used between the drive shaft and the row unit equipment. The frequency domain signal is evaluated. More specifically, in one example, the power in the frequency bins of the frequency domain signal that are within a desired frequency range of the input frequency is then compared to a threshold power value in order to determine a slip status.

The slip status indicates whether a slip clutch is slipping. The slip status can be verified using any of a variety of different interlocks, and a control signal can be generated based upon the verified slip status. The present description thus describes a system with enhanced slip detection accuracy even in noisy environments.

FIG. 1 is a pictorial illustration of an agricultural system 100 in which an agricultural harvester 102 has a corn head 104 attached thereto. The corn head 104 has a plurality of snouts 106 that serve to divide the rows of corn and direct the corn stalks in the rows into the row unit equipment (which may include gathering chains, snap rolls, choppers, etc. One or more drive shafts 108 are powered by a power takeoff on agricultural harvester 102 and drive rotation of a row unit drive shaft 112 through one or more gear boxes 114. The row unit drive shaft 112 drives rotation of the row unit equipment. It will be appreciated that there can be more than one drive shaft 108 and more than one row unit drive shaft 112 for driving different sets of the row unit equipment. A single drive shaft 108 and row unit drive shaft 112 that is used to drive all of the row unit equipment is shown in FIG. 1 for the sake of example only.

Agricultural harvester 102 can proceed through a field in the direction generally indicated by arrow 124. As agricultural harvester 102 proceeds in the direction indicated by arrow 124, the different row units on header 104 engage the crop and process the crop rows.

Also, in the example shown in FIG. 1, drive shaft 108 drives an auger 116. As ears of corn are removed from stalks by the row unit equipment, those ears of corn are directed to a central opening in header 104 and a separate conveyor feeds the ears of corn through that opening (generally in the direction indicated by arrow 118) into a feeder house 120 of agricultural harvester 102. The feeder house 120 may accelerate the harvested ears of corn into additional harvesting mechanisms that are located within agricultural harvester 102.

As discussed above, it may happen that one or more of row units have equipment that becomes jammed so that it no longer operates. Therefore, a plurality of different slip clutches are mounted between row unit drive shaft 112 and the row unit equipment (such as the drive mechanisms that drive the gathering chains, the snap rolls, the choppers, etc.). If the row unit equipment on one of the row units becomes jammed, then the corresponding slip clutch 122 begins to slip, thus isolating that jammed row unit equipment from the drive shaft 112, and from drive shaft 108, and gear boxes 114, on header 104. This allows the remaining row units on header 104 to continue operating, even while one of the row units is jammed.

Also, as discussed above, it can be harmful to allow a slip clutch 122 to keep slipping for an extended period of time. Therefore, in the example illustrated in FIG. 1, agricultural system 100 includes one or more acceleration sensors 126-128, which may be mounted on a frame that carries the row units and supports row unit drive shaft 112. While a single acceleration sensor may be used, or any number of acceleration sensors, the present discussion proceeds with respect to an acceleration sensor 126 on one end of header 104 and one acceleration sensor 128 on another end of header 104, although this is only one example.

A slip clutch detection system 130 receives sensor signals 132 from the acceleration sensors 126-128 and processes those sensor signals to identify when a slip clutch 122 is slipping. In one example, slip clutch detection system 130 generates an output to an operator interface 133 on agricultural harvester 102. The operator interface 133 may be an audio, visual, and/or haptic interface that provides an alarm that is observable by an operator. In another example, slip clutch detection system 130 may generate a control signal 134 that can be used to control functionality on agricultural harvester 102 and/or header 104. For instance, the control signal 134 may cause agricultural harvester 102 to stop, and/or to stop the power takeoff driving drive shaft 108 until the jam can be cleared. Control signal 134 may control functions on header 104 to reverse the gathering chains in order to assist in clearing the jam. Also, the slip clutch detection system 130 may generate an output to operator interface 133 or elsewhere identifying which particular slip clutch is slipping, which particular row unit is jammed, among other things. These are only examples of the output from slip clutch detection system 130, and other outputs can be generated as well.

Before describing the operation of slip clutch detection system 130 in more detail, a brief description of the examples of different types of slip clutches 122 will first be provided. In one example, the slip clutch includes two plates that have opposing faces. A set of spring biased pins are disposed in apertures on one of the faces and biased outwardly to engage groves or openings in the other of the two faces. When the clutch is slipping, the pins retract against the spring bias into the apertures so that one of the plates can keep rotating relative to the other plate. This results in the spring bias pins reciprocating inwardly and outwardly, as the faces rotate relative to one another, and as the clutch continues to slip. In another example, the slip clutches may be star-type slip clutches in which a pair of plates have radially extending ridges which define grooves therebetween. The two plates are spring biased into engagement with one another as one plate is stopped and the other plate continues to rotate. When experiencing excessive torque, the springs yield and the ridges on the two opposing plates "chatter" against one another. Therefore, in both of these types of slip clutches, the vibrations caused when the clutch is slipping are generally periodic and have a repetition rate at a predominant or fundamental frequency that is a product of the rotational speed of the clutch and the number of ridges or pins. The vibrations may also occur at overtone frequencies of diminishing magnitude. There are various other types of slip clutches that also have teeth or lobes or other detents that engage one another and thus similarly generate vibrations at a fundamental or predominant frequency that is a product of the frequency of rotation of the slip clutch and the number of teeth, lobes or detents.

Figure 2:
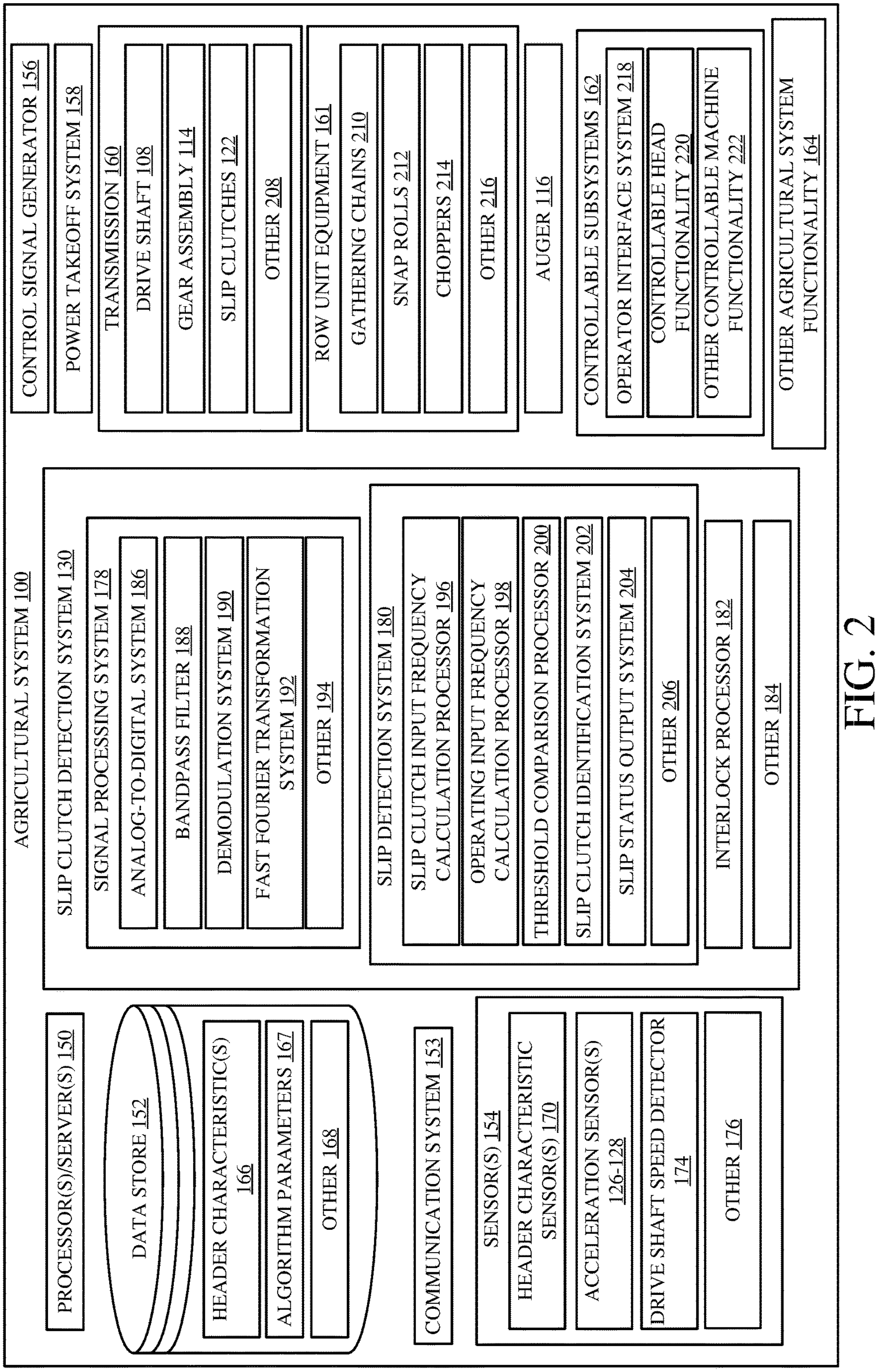
FIG. 2 is a block diagram showing one example of the agricultural system in more detail.

FIG. 2 is a block diagram showing one example of agricultural system 100 in more detail. In the example shown in FIG. 2, agricultural system 100 includes one or more processors or servers 150, data store 152, communication system 153, sensors 154, slip clutch detection system 130, control signal generator 156, power take off system 158, transmission 160, row unit equipment 161, auger 116, controllable subsystems 162, and/or other agricultural system functionality 164. Data store 152 can include header characteristics 166, algorithm parameters 167, and other items 168. Sensors 154 can include header characteristic sensor(s) 170, acceleration sensor(s) 126-128, drive shaft speed detector 174, and any of a wide variety of other sensors 176. Slip clutch detection system 130 can include signal processing system 178, slip detection system 180, interlock processor 182, and other items 184. Signal processing system 178 can include analog-to-digital converter 186, bandpass filter 188, demodulation system 190, Fast Fourier Transformation system 192, and other items 194. Slip detection system 180 can include slip clutch input frequency calculation processor 196, operating input frequency calculation processor 198, threshold comparison processor 200, slip clutch identification system 202, slip status output system 204, and other items 206. Transmission 160 can include drive shaft 108, gear assembly 114, slip clutches 122, and other items 208. Row unit equipment 161 can include gathering chains 210, snap rolls 212, choppers 214, and other items 216. Controllable subsystems 162 can include operator interface system 218, controllable head functionality 220, and other controllable machine functionality 222. Before describing the operation of agricultural system 100 in more detail, a description of some of the items in agricultural system 100, and their operation, will first be described.

Communication system 153 can enable communication of the items in agricultural system 100 with one another and may also enable communication with other machines, other systems, cloud-based systems, among other things. Communication system 153 may thus be a controller area network (CAN) bus and bus controller, a communication system that facilitates communication over a cellular network, a wide area network, a local area network, a near-field communication network, a wifi or Bluetooth network, among other things.

Header characteristics 166 can be detected by header characteristic sensor(s) 170 or received over a communication system 153, received through operator interface system 218, or received in other ways. Header characteristics 166 may characterize header 104 and include such things as the type of frame used on header 104 (a rigid frame, or a folding frame), the number of rows processed by header 104, whether header 104 is configured with choppers 214, the gear ratio between the drive shaft 108 and slip clutches 102, and the slip clutch configuration of slip clutches 122 (such as the number of pins, the number of teeth or extending ridges, or other configuration information).

Header characteristic sensor(s) 170 can be mounted to harvester 102 and/or header 104 to sense the header characteristics 166. Header characteristic sensor(s) 170 can also sense operational characteristics of header 104 such as whether the drive shaft 108 is engaged, whether drive shaft 108 is rotating in a forward or reverse direction, the direction that the row unit equipment 161 is running, among other things. Thus, header characteristic sensor(s) 170 may be Hall Effect sensors, potentiometers, or other sensors. Acceleration sensors 126-128 can be accelerometers or other vibration sensors. It will be noted that the signal processing system 178, or some of the items in signal processing system 178, may be located on acceleration sensors 126-128. The signal processing system 178 is shown separately from acceleration sensors 126-128 for the sake of example only. Drive shaft speed detector 174 detects the speed of drive shaft 108 and/or other drive shafts on header 104. Drive shaft speed detector 174 can be a Hall Effect sensor, a sensor that senses the speed of the power takeoff system 158 that is driving drive shaft 108, or any of a wide variety of other detectors that can detect the rotational speed of drive shaft 108.

Analog-to-digital converter 186 can be any type of analog-to-digital converter 186 that can convert the signals from acceleration sensors 126-128 into a digital signal. Bandpass filter 188 may be a variable bandpass filter that varies the pass band based upon the speed of drive shaft 108 sensed by drive shaft speed detector 174. In another example, bandpass filter 188 may be multiple different bandpass filters that are switched into and out of processing the signal output by analog-to-digital converter 186 based upon the speed detected by drive shaft speed detector 174.

In yet another example, bandpass filter 188 is arranged to pass a band of frequencies wide enough to cover the expected frequencies of rotation of drive shaft 108. The bandpass filter 188 may be a Butterworth filter, a Chebyshev filter, an elliptic filter, or another filter. The order of the bandpass filter 188 can be chosen empirically to fit the characteristics of header 104 and other hardware used in agricultural system 100, or chosen in another way.

Demodulation system 190 demodulates the filtered signal provided by bandpass filter 188. Demodulation system 190 performs an enveloping operation which down samples the original frequency of the filtered signal, because the frequency of interest will normally be much lower than the original frequency. Demodulation system 190 may implement any of a wide variety enveloping methods, such as a Hilbert demodulator, a finite impulse response (FIR) filter, a root mean square (RMS) demodulation system, a peak demodulation system, among others. Fast Fourier Transformation system 192 can implement any of a wide variety of transformation algorithms, such as the Cooley Tukey algorithm, or other algorithms, that transform the modulated signal into the frequency domain.

Slip clutch input frequency calculation processor 196 calculates a frequency at which slip clutch impulses or vibrations detected by acceleration sensors 126-128 are expected, if a slip clutch 126-128 is slipping. Where drive shaft speed detector 174 detects the rotational velocity of drive shaft 108, then slip clutch input frequency calculation processor 196 calculates a slip clutch input frequency as follows:

$$\text{Slip clutch input frequency } (F_{IL}) = F_{drive\ shaft} * N * \text{Gear Ratio} \quad \text{EQ. 1}$$

Where Fdrive shaft is the frequency of drive shaft 108;
N is the number of pins or teeth on the slip clutch 122; and
Gear Ratio is the Gear Ratio between the drive shaft 108 and the shaft used to drive the row unit equipment, on which slip clutch 122 is deployed.

Where the speed of drive shaft 108 is not available (such as where no drive shaft speed detector 174 is used), then operating input frequency calculation processor 198 calculates a frequency range, based upon the expected frequencies of rotation of drive shaft 108, as follows:

$$\text{Operating input frequency } F_{IS} = F_{drive\ shaft\ min/max} * N * \text{Gear Ratio} \quad \text{EQ. 2}$$

where $F_{drive\ shaft\ min/max}$ represents the minimum and maximum expected frequencies of rotations of drive shaft 108.

Threshold comparison processor 200 then identifies the energy level in the frequency bins output by Fast Fourier Transformation system 192 that are within a desired range of either the slip clutch input frequency (calculated as set out in EQ. 1 above) or the operating input frequency (calculated as set out in EQ. 2 above) to a threshold energy value. If the energy values in the frequency bins meet the threshold energy value, then this indicates that a slip clutch 122 is slipping. If the energy values in the frequency bins do not meet the threshold value, then this indicates that no slip clutch 122 is slipping.

In the example shown in FIG. 2, slip detection system 180 can also include a slip clutch identification system 202. Slip clutch identification system 202 can be configured to identify the particular slip clutch 122 that is slipping (or a set of slip clutches 122 that includes the particular slip clutch 122 that is slipping). For instance, each of the slip clutches 122 may be provided with a different number of teeth or reciprocating pins. In that case, the slip clutch input frequency calculation processor 196 can calculate a different slip clutch input frequency corresponding to each of the different slip clutches 122, and operating input frequency calculation processor 198 can also calculate a different operating input frequency corresponding to each of the different slip clutches 122. Threshold comparison processor 200 can determine whether the energy values in the different energy bins meet thresholds, where the frequency bins will vary by slip clutch 122. Thus, each slip clutch 122 will have a corresponding, separate set of frequency bins. The frequency bins corresponding to each slip clutch 122 will be checked to determine whether that slip clutch 122 is slipping. In this way, slip detection system 180 can check to determine whether each individual slip clutch 122 is slipping and slip clutch identification system 202 can identify that particular slip clutch 122 based upon the particular frequency bins that are found to have a threshold energy value. In another example, the power spectral density (the power of the frequency domain signal) is stronger when the slipping clutch 122 is closer to the vibration sensor(s) 126-128. Therefore, the power spectral density can be used to identify which slip clutches 122 are slipping. In another example, the particular slip clutch 122 that is slipping need not be identified or may be identified in another way.

Slip status output system 204 generates an output signal indicating whether a slip clutch 122 is slipping. In addition, where the particular slip clutch 122 is identified, then slip status output system 204 also provide an output identifying which particular slip clutch 122 is slipping.

Interlock processor 182 can apply one or more different interlocks to validate the slip status. For instance, if the header 104 is not engaged (e.g., if the drive shaft 108 is not engaged) then the slip status will not be verified. Similarly, if the drive shaft 108 is not engaged in the forward direction, then the slip status will not be verified. In yet another example, interlock processor 182 may verify the slip status based upon whether other harvesting functionality (such as the separator in agricultural harvester 102) is operating.

If interlock processor 182 verifies a slip status indicating that a slip clutch 122 is slipping, then interlock processor 182 generates an output to control signal generator 156.

Control signal generator 156 generates a control signal based upon the verified slip status. For instance, control signal generator 156 can generate a control signal to control operator interface system 218 to generate an output on operator interface 132 to indicate to an operator that a slip clutch 122 is slipping. The output may be an audio, visual, or haptic output. Control signal generator 156 may also generate an output to control any controllable head functionality 220 or other controllable machine functionality 222 on agricultural harvester 102. These are examples and other control signals can be generated as well.

FIG. 2 also shows that agricultural harvester 102 may include a power takeoff system 158 that drives a transmission 160. Transmission 160 drives row unit equipment 161. The transmission 160 may include drive shaft 108, gear box assembly 114, slip clutches 122, and other items 208. Transmission 160 may drive row unit equipment 161 which, can include gathering chains 210, snap rolls 212, choppers 214, and/or other items 216. FIG. 2 also shows that transmission 160 can drive auger 116.

Figure 3A:
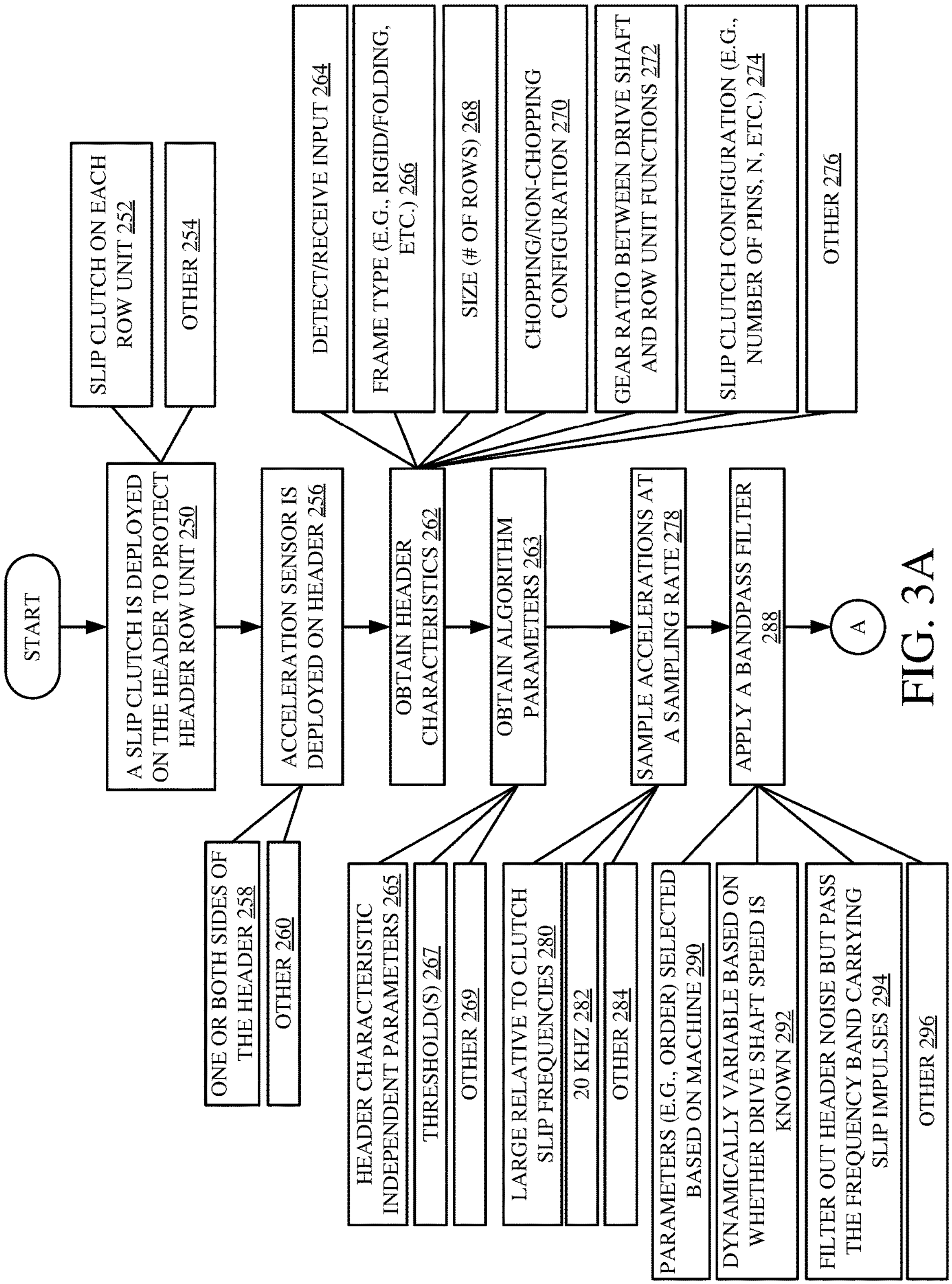
FIGS. 3A, 3B and 3C (collectively referred to herein as FIG. 3) show a flow diagram illustrating one example of the operation of the agricultural system in detecting clutch slips.
Figure 3B:
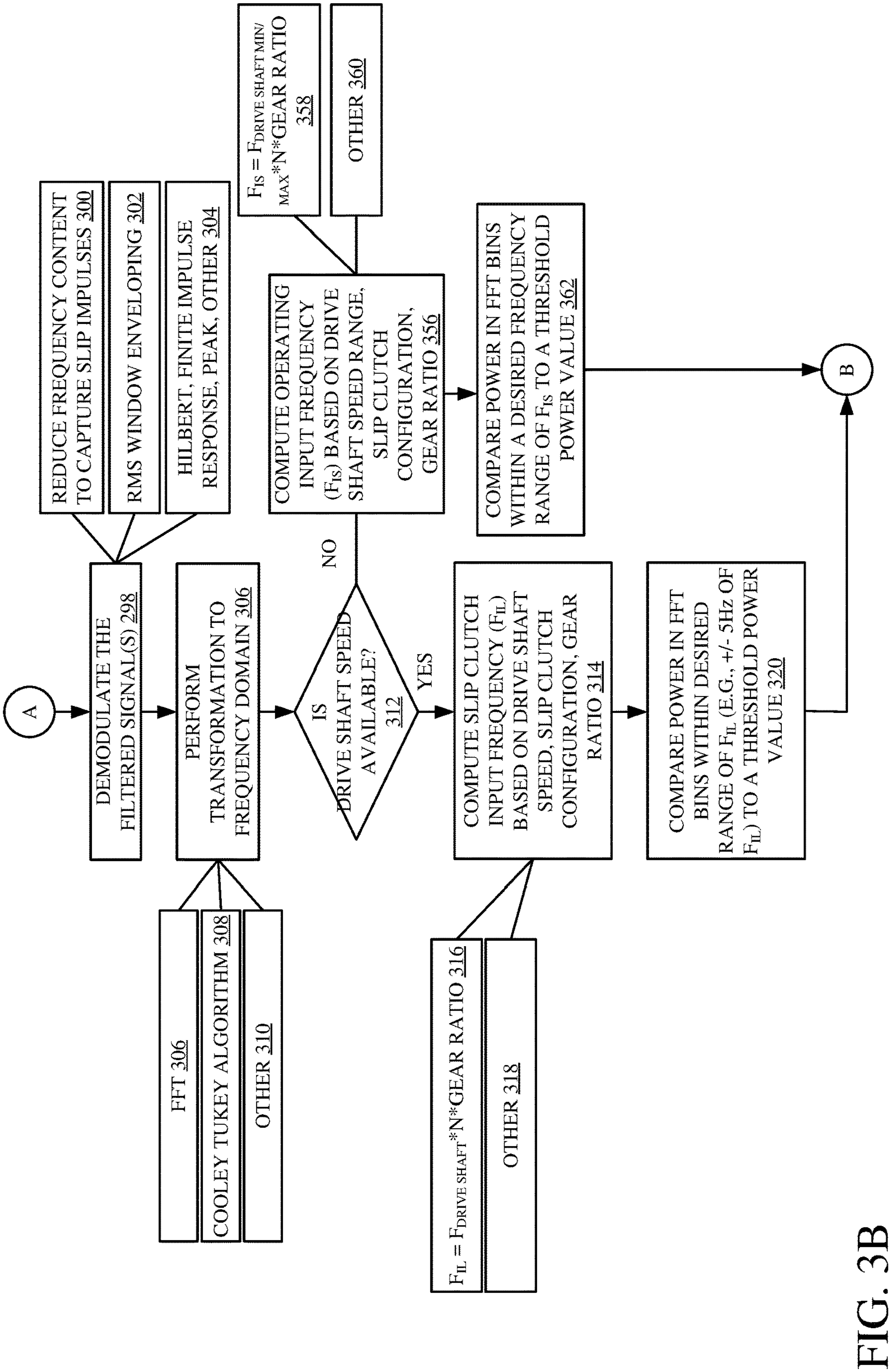
Figure 3C:
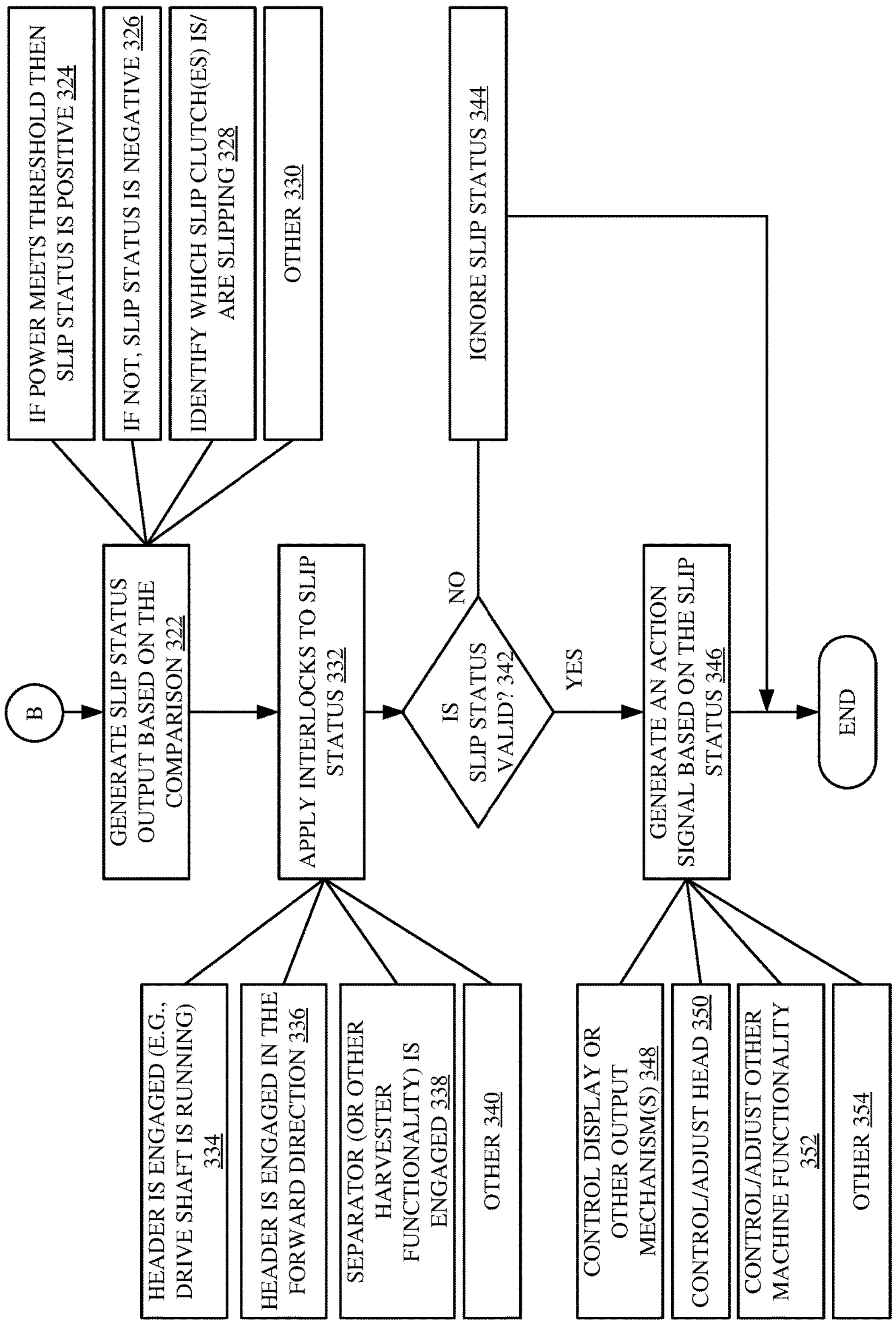

FIGS. 3A, 3B and 3C (collectively referred to herein as FIG. 3) show a flow diagram illustrating one example of the operation of agricultural system 100 in detecting a clutch slip of a slip clutch 122. It is first assumed that a slip clutch 122 is deployed on the header to protect the row unit equipment on the header, as indicated by block 250 in the flow diagram of FIG. 3. In one example, a slip clutch 122 is deployed on each row unit, as indicated by block 252. The slip clutches 122 can be deployed in other ways, such as to protect sets of row units, or in other ways, as indicated by block 254. It is also assumed that an acceleration sensor 126-128 is deployed on header 104, as indicated by block 256 in the flow diagram of FIG. 3. The acceleration sensor 126-128 can be deployed on one side of header 104, or on both sides, as indicated by block 258, or in other locations, as indicated by block 260.

At some point, slip clutch detection system 130 obtains characteristics of header 104 that will be used to determine whether a slip clutch 122 is slipping. Obtaining header characteristics is indicated by block 262 in the flow diagram of FIG. 3. As discussed above, the header characteristics can be detected by header characteristic sensor(s) 170 or received through communication system 153 or through operator interface system 218 in other ways, and stored as header characteristics 166 in data store 152. Detecting or receiving an input indicative of the header characteristics 166 is indicated by block 264 in the flow diagram of FIG. 3.

Further, slip clutch detection system 130 obtains algorithm parameters 167 that are to be used to detect slipping, as identified by block 263. The parameters 167 can be calculated off line (e.g., in a remote server environment or elsewhere). The parameters 167 can be independent of the header characteristics 166 as indicated by block 265 and can include such things as threshold values 267, and/or other values 269.

The header characteristics 166 can include a frame type, such as whether the frame of header 104 is rigid, or folding, as indicated by block 266. The header characteristics 166 can include the size (in terms of the number of rows) of header 104, as indicated by block 268. The header characteristics 166 can indicate whether header 104 is configured as a chopping header or a non-chopping header, as indicated by block 270. The header characteristics 166 can also include the gear ratio of the gears between the drive shaft 108 and row unit equipment 161 as indicated by block 272 in the flow diagram of FIG. 3. The header characteristics 166 can also include the slip clutch configuration, such as the number of pins or teeth (N) on the slip clutches 122 as indicated by block 274. The header characteristics 166 can include other characteristics as well, as indicated by block 276.

Analog-to-digital converter 186 samples the acceleration signal generated by acceleration sensors 126-128 at a sampling rate that is higher than the frequency of the clutch slip impulses, as indicated by block 278 in the flow diagram of FIG. 3. For instance, the clutch slip impulses may occur at a frequency in a range of 50 Hz-100 Hz, for example, and the sampling rate is much higher than that, as indicated by block 280. In one example, where the clutch slip impulses will occur at a frequency of 50-100 Hertz, then the sampling rate may be 20 KHz, as just one example. Sampling the acceleration signal at a high sampling rate, such as 20 KHz, is indicated by block 282 in the flow diagram of FIG. 3. The sampling rate can be any of a wide variety of other sampling rates as well, as indicated by block 284.

Analog-to-digital converter 186 performs an analog-to-digital conversion on the sampled acceleration signal, as indicated by block 286. The digital signal is then filtered by bandpass filter 188, as indicated by block 288 in the flow diagram of FIG. 3. During normal harvesting conditions, when no clutches 122 are slipping, there are a combination of vibrations, such as noise and drive chain vibrations and other sources, that cause vibrations at a beat frequency. The energy content at such frequencies may be relatively strong so that the energy content interferes with detection of slip impulses. Therefore, the parameters (e.g., the order and pass band) of bandpass filter 188 may be based upon the characteristics of header 104 and/or agricultural harvester 102. The characteristics of header 104 may include the normal harvesting vibration energy band and the energy band of the clutch slip impulses. Providing a bandpass filter with parameters that are based on machine characteristics is indicated by block 290 in the flow diagram of FIG. 3. In one example, bandpass filter 188 is dynamically variable based on whether the drive shaft speed is known, as indicated by block 292 in the flow diagram of FIG. 3. For instance, if the drive shaft speed is known, then bandpass filter 188 can pass a frequency band that includes desired set of frequencies that will be proportional to the frequency of rotation of the drive shaft 108. However, if the drive shaft speed is not known, then bandpass filter 188 may pass a wider band of frequencies corresponding to the expected maximum and minimum rotation frequencies of drive shaft 108. The bandpass filter 188 filters out header noise but passes the frequency band that will be carrying the slip impulses generated by a slip clutch 122 that is slipping, as indicated by block 294. The bandpass filter 188 can be applied in other ways as well, as indicated by block 296.

Demodulation system 190 then demodulates the filtered signal provided by bandpass filter 188. Demodulating the filtered signal is indicated by block 298 in the flow diagram of FIG. 3. Demodulation reduces the frequency content of the signal to better isolate and capture the slip impulses, as indicated by block 300. In one example, the demodulation system 190 executes an RMS window enveloping algorithm, as indicated by block 302. The demodulation system 190 can also be a Hilbert demodulator, a finite impulse response demodulator, a peak demodulator, or another demodulator as indicated by block 304.

Fast Fourier Transformation system 192 performs a transformation on the demodulated signal to transform the demodulated signal to the frequency domain, as indicated by block 306. Fast Fourier Transformation (FFT) system 192 can run the Cooley Tukey algorithm as indicated by block 308, or perform another frequency domain transformation, as indicated by block 310.

Slip clutch detection system 180 detects whether the drive shaft speed is available from drive shaft speed detector 174, as indicated by block 312. If so, then slip clutch input frequency calculation processor 196 computes the slip clutch input frequency (FIL) based upon the drive shaft speed, the slip clutch configuration (such as the number of teeth or pins (N) in the slip clutch), and the gear ratio between the drive shaft 108 and the slip clutch 122, as indicated by block 314 in the flow diagram of FIG. 3. FIL can be computed according to EQ. 1 above, as indicated by block 316 in FIG. 3, or in another way, as indicated by block 318 in the flow diagram of FIG. 3.

Threshold comparison processor 200 then compares the power in the FFT bins generated by FFT system 192 that are within a desired range of FIL (such as within + or −5 Hz of FIL or within another desired range) to a threshold power value, as indicated by block 320 in the flow diagram of FIG. 3. The desired range of frequencies may be determined empirically or in another way. Also, the threshold power value can also be identified empirically, or based upon the characteristics of header 104, or the characteristics of agricultural harvester 102, in other ways.

Based upon that comparison, slip status output system 204 generates a slip status indicating whether a clutch slip is occurring, as indicated by block 322 in the flow diagram of FIG. 3. For instance, if the power in the FFT bins meets the threshold power value, then slip status output system 204 may generate an output indicating that the slip status is positive, or that a clutch slip is occurring, as indicated by block 324. If the power in the FFT bins does not meet the threshold power value, then slip status output system 204 may generate an output indicating that a clutch slip is not occurring, as indicated by block 326 in the flow diagram of FIG. 3. Where slip clutch identification system 202 is used, then the slip status output system 204 can generate the slip status to also indicate which slip clutch 122 is slipping, as indicated by block 328 in the flow diagram of FIG. 3. Slip status output system 204 can generate an output indicative of the slip status in other ways as well, as indicated by block 330.

The slip status output may be provided to interlock processor 182 which applies interlocks to the slip status to determine whether the slip status is valid. Applying interlocks is indicated by block 332 in the flow diagram of FIG. 3. For instance, header characteristic sensor(s) 170 may generate a signal indicating whether the header 104 is engaged (in that the drive shaft 108 is running). If not, then the slip status is irrelevant and thus interlock processor 112 identifies the slip status as being invalid. Detecting the validity of the slip status based on upon whether the header 104 is engaged is indicated by block 334 in the flow diagram of FIG. 3.

Header characteristic sensor 170 may also detect whether the header 104 is engaged in the forward direction (e.g., the row units have not been reversed, such as to clear a jam, or for another reason). If the header 104 is not engaged in the forward direction then, again, the slip status is not valid. Detecting the validity of the slip status based upon whether the header 104 is engaged in the forward direction is indicted by block 336 in the flow diagram of FIG. 3.

Interlock processor 182 may apply other interlocks as well. For instance, other sensors 176 may sense whether the separator in agricultural harvester 102 is engaged or whether any of the other harvesting functionality on agricultural harvester 102 is engaged. If not, this can also mean that the slip status is invalid. Detecting the validity of slip status based upon whether the separator is engaged (or, indeed, based upon whether other harvesting functionality on agricultural harvester 102 is engaged) is indicated by block 338 in the flow diagram of FIG. 3. Other interlocks can be applied as well, as indicated by block 340 in the flow diagram of FIG. 3.

If the slip status is invalid, as determined by interlock processor 182 at block 342 in the flow diagram of FIG. 3, then the slip status is simply ignored, as indicated by block 344. However, if, at block 342, interlock processor 182 determines that the slip status is valid, then interlock processor 182 generates an output to control signal generator 156 indicating the slip status, and that the slip status is valid. Control signal generator 156 generates an action signal (such as a control signal) based upon the slip status. Generating an action signal is indicated by block 346 in the flow diagram of FIG. 3. The action signal or control signal can be used to control any of a wide variety of controllable subsystems 162. For instance, the control signal generated by control signal generator 156 can be used to control operator interface system 218 to control a display or other output mechanism that may alert an operator of agricultural harvester 102 that a slip is occurring, the location of the slip, and other information (such as how long the slip has occurred). Controlling a display or other output mechanism based upon a valid slip status is indicated by block 348 in the flow diagram of FIG. 3. The control signal generated by control signal generator 156 can also be used to control a variety of different types of controllable head functionality 220, as indicated by block 350, or a variety of different controllable machine functionality 222, as indicated by block 352 in the flow diagram of FIG. 3. The control signal generator 156 can generate the control signal in other ways, to control other functionality as well, as indicated by block 354.

Returning again to block 312 in the flow diagram of FIG. 3, if slip detection system determines that the drive shaft speed is not available, then operating input frequency calculation processor 198 computes the operating input frequency FIS based upon an expected frequencies of rotation of drive shaft 108, based upon the slip clutch configuration, and based upon the gear ratio. For instance FIS can be computed based upon a maximum expected drive shaft speed and FIS can also be computed based upon a minimum drive shaft speed. Computing FIS based upon a range of drive shaft speeds is indicated by block 356 in the flow diagram of FIG. 3. In one example, FIS is computed as set out in EQ. 2 above, as indicated by block 358 in the flow diagram of FIG. 3. FIS can be computed in other ways as well, as indicated by block 360.

Once the FIS values are computed, then threshold comparison processor 200 compares the power in the frequency bins that are computed by FFT system 192 and that are within a desired frequency range of the FIS values to a threshold power value to determine whether a clutch slip is occurring. Comparing the power in the FFT bins to a threshold power value is indicated by block 362 in the flow diagram of FIG. 3. Based upon the comparison, processing continues at block 322 and following where a slip status is output, interlocks are applied, and control signals are generated for valid slip status values indicating that a clutch slip is occurring.

In one example, signal processing system 178 automatically adjusts the parameters of signal processing system 178 based on whether FIL, FIS, and/or the drive shaft frequency are available. If all information is available (such as on CAN messages), then the algorithm automatically examines a narrower frequency band with tighter thresholds. If some or all of the information is not available, then the algorithm automatically examines a wider frequency band with thresholds that are less tight. By automatically, it is meant, in one example, that the function or operation is performed without further human involvement except perhaps, to initiate or authorize the function or operation.

It can thus be seen that the present description proceeds with respect to a system that can identify clutch slip conditions even without knowing the drive shaft speed. Also, because the signal that is filtered by bandpass filter 188 is demodulated by demodulation system 190, a large amount of the frequency content of the signal is removed so that clutch slip impulses can be identified more readily. Further, because the present description proceeds with respect to analysis of the clutch slip impulses in the frequency domain, clutch slips can be identified more accurately than in other systems.

The present discussion has mentioned processors and servers. In one example, the processors and servers include computer processors with associated memory and timing circuitry, not separately shown. The processors and servers are functional parts of the systems or devices to which the processors and servers belong and are activated by, and facilitate the functionality of the other components or items in those systems.

Also, a number of user interface (UI) displays have been discussed. The UI displays can take a wide variety of different forms and can have a wide variety of different user actuatable input mechanisms disposed thereon. For instance, the user actuatable input mechanisms can be text boxes, check boxes, icons, links, drop-down menus, search boxes, etc. The mechanisms can also be actuated in a wide variety of different ways. For instance, the mechanisms can be actuated using a point and click device (such as a track ball or mouse). The mechanisms can be actuated using hardware buttons, switches, a joystick or keyboard, thumb switches or thumb pads, etc. The mechanisms can also be actuated using a virtual keyboard or other virtual actuators. In addition, where the screen on which the mechanisms are displayed is a touch sensitive screen, the mechanisms can be actuated using touch gestures. Also, where the device that displays them has speech recognition components, the mechanisms can be actuated using speech commands.

A number of data stores have also been discussed. It will be noted the data stores can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, components, sensors, detectors, filters, converters, generators, and/or logic. It will be appreciated that such systems, components, sensors, detectors, filters, converters, generators, and/or logic can be comprised of hardware items (such as processors and associated memory, or other processing components, some of which are described below) that perform the functions associated with those systems, components, sensors, detectors, filters, converters, generators, and/or logic. In addition, the systems, components, sensors, detectors, filters, converters, generators, and/or logic can be comprised of software that is loaded into a memory and is subsequently executed by a processor or server, or other computing component, as described below. The systems, components, sensors, detectors, filters, converters, generators, and/or logic can also be comprised of different combinations of hardware, software, firmware, etc., some examples of which are described below. These are only some examples of different structures that can be used to form the systems, components, sensors, detectors, filters, converters, generators, and/or logic described above. Other structures can be used as well.

Figure 4:
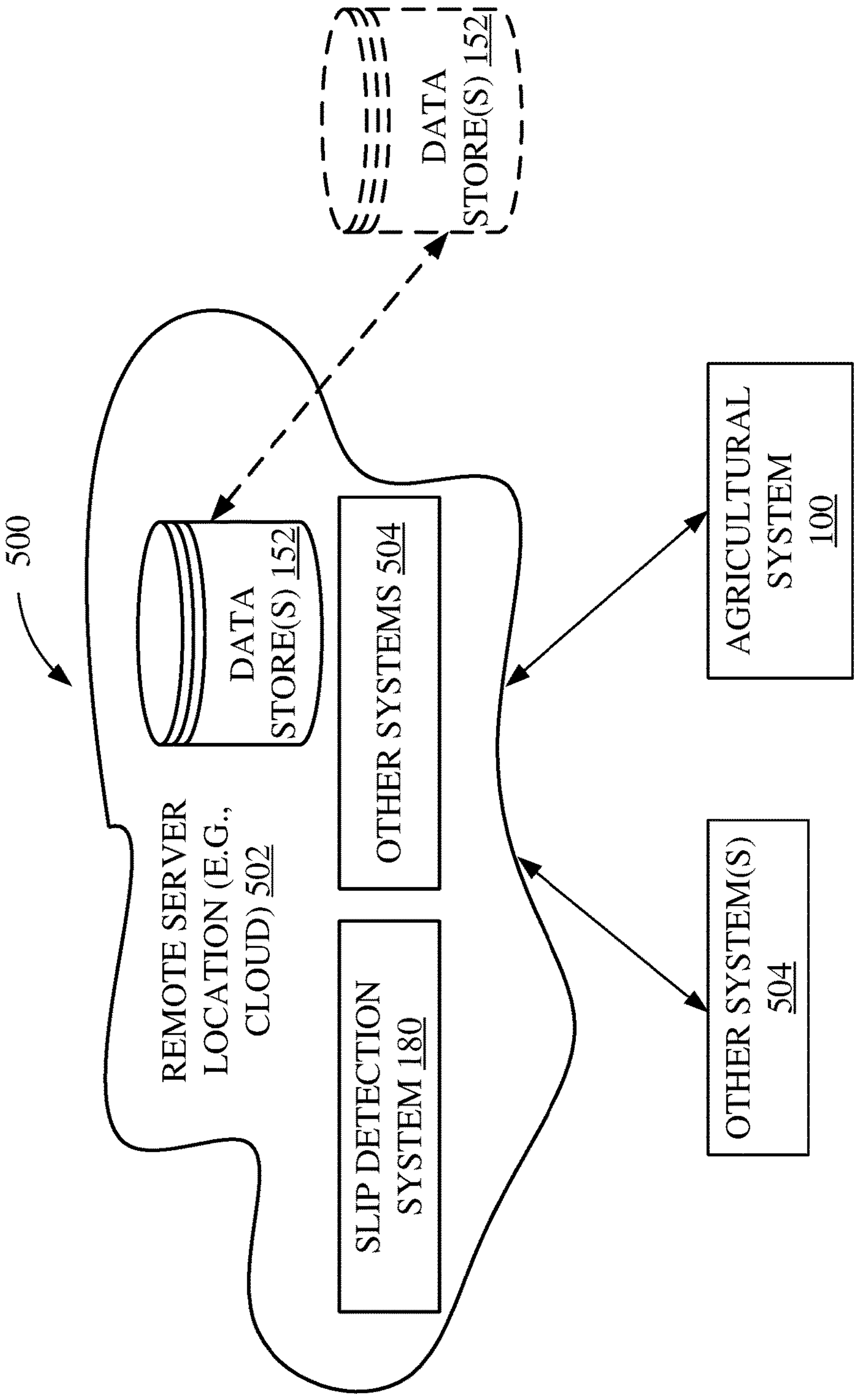
FIG. 4 is a block diagram showing one example of the agricultural system deployed in a remote server environment.

FIG. 4 is a block diagram of agricultural system 100, shown in FIGS. 1 and 2, except that system 100 communicates with elements in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in previous FIGS. as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, the components and functions can be provided from a conventional server, or they can be installed on client devices directly, or in other ways.

In the example shown in FIG. 4, some items are similar to those shown in previous FIGS. and those items are similarly numbered. FIG. 4 specifically shows that slip detection system 180, data store 152, and/or other systems 504 can be located at a remote server location 502. Therefore, harvester 100 accesses those systems through remote server location 502.

In one example, data analysis is performed in a non-real-time environment so the parameters of the detection algorithm can be computed to obtain values that work across different machine/header configurations. The parameters can then be downloaded for use in agricultural system 100 (e.g., the parameters can be stored in data store 152 and used during harvesting). In another example, the parameters can be fetched and consumed during runtime. Both scenarios are contemplated herein.

FIG. 4 also depicts another example of a remote server architecture. FIG. 4 shows that it is also contemplated that some elements of previous FIGS are disposed at remote server location 502 while others are not. By way of example, data store 152 can be disposed at a location separate from location 502, and accessed through the remote server at location 502. Regardless of where the items are located, the items can be accessed directly by agricultural system 100, through a network (either a wide area network or a local area network), the items can be hosted at a remote site by a service, or they can be provided as a service, or accessed by a connection service that resides in a remote location. All of these architectures are contemplated herein.

It will also be noted that the elements of previous FIGS., or portions of the elements, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 5:
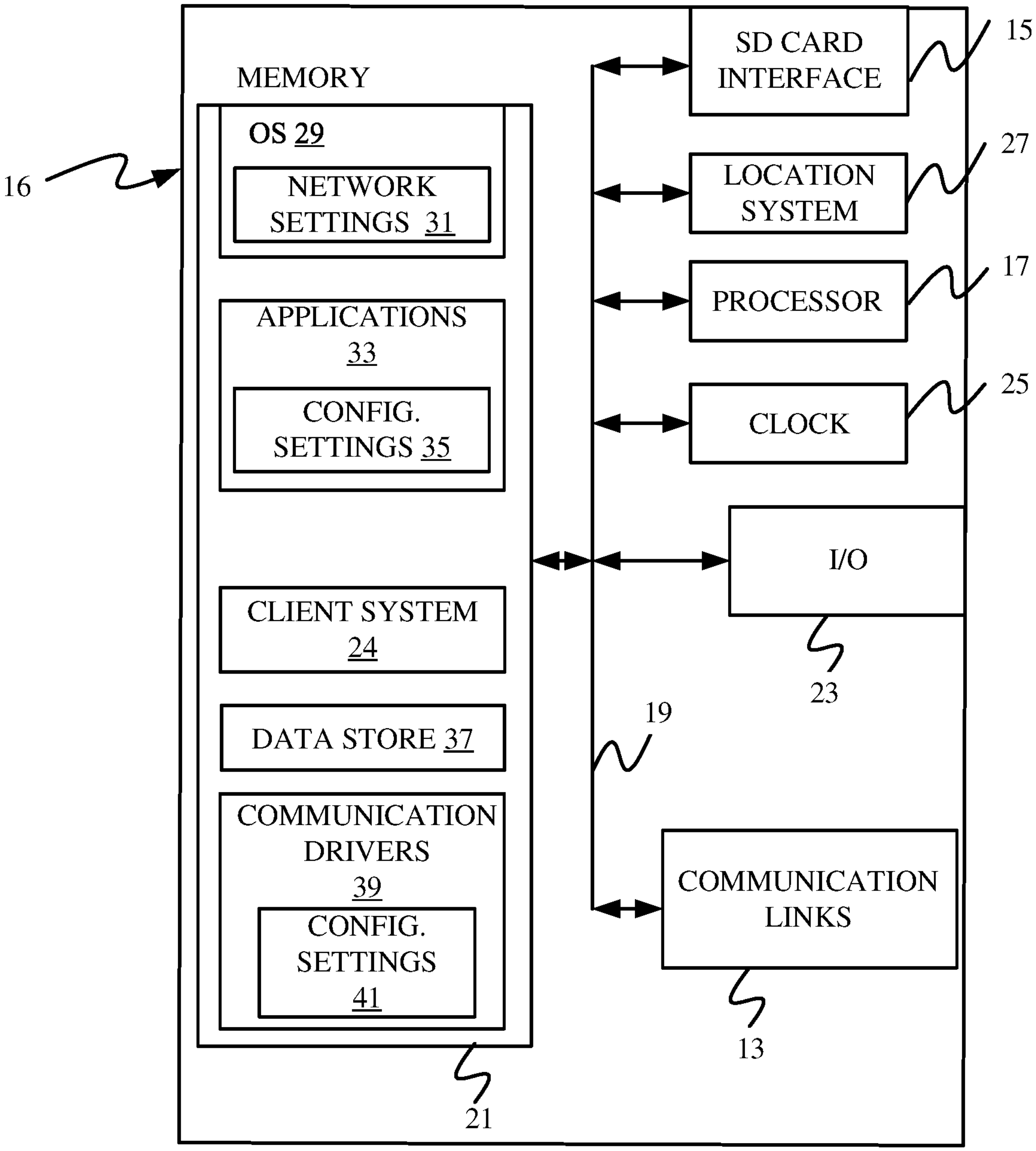
FIGS. 5-7 show examples of mobile devices that can be used in the architectures and systems shown in other figures.
Figure 6:
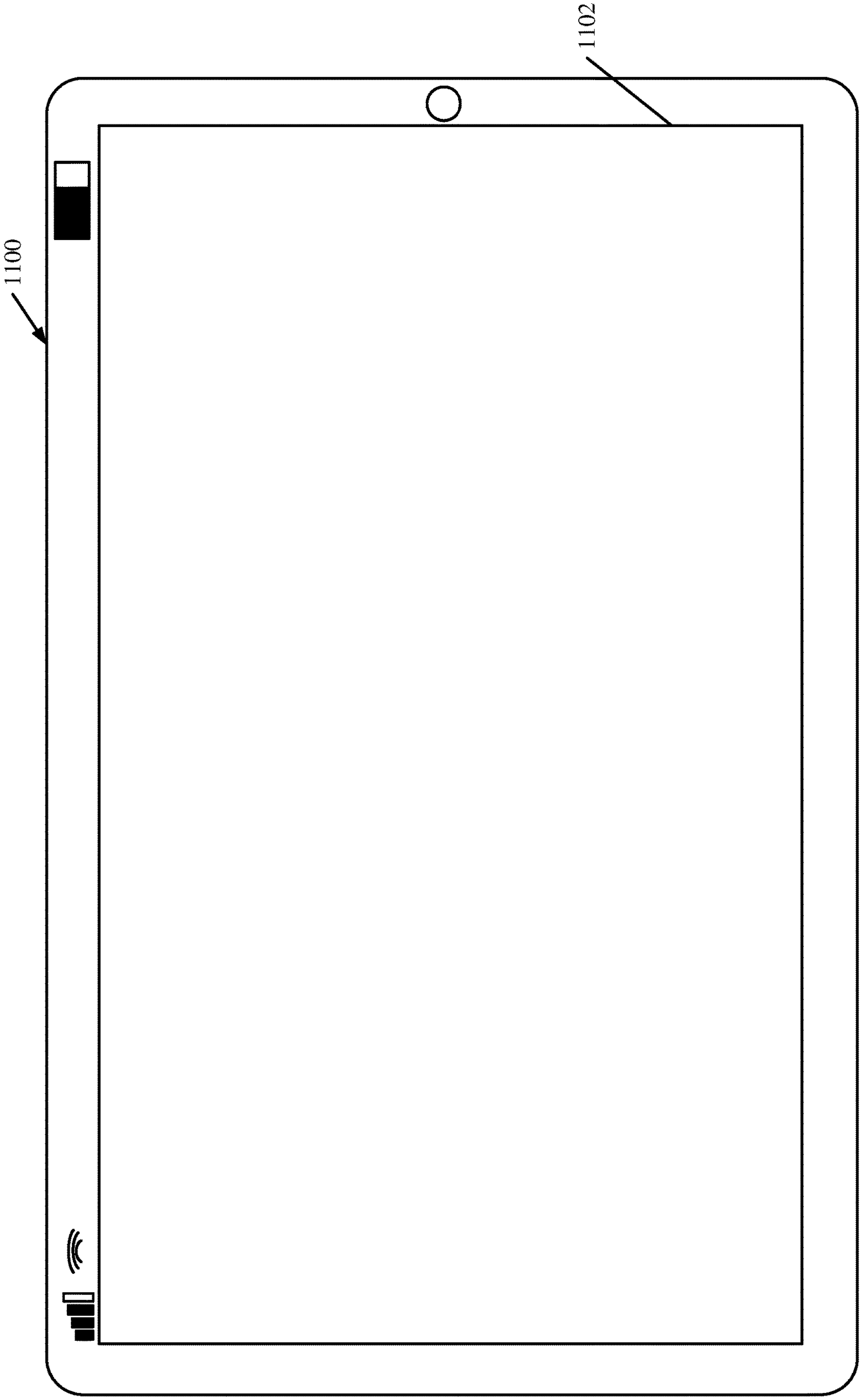
Figure 7:
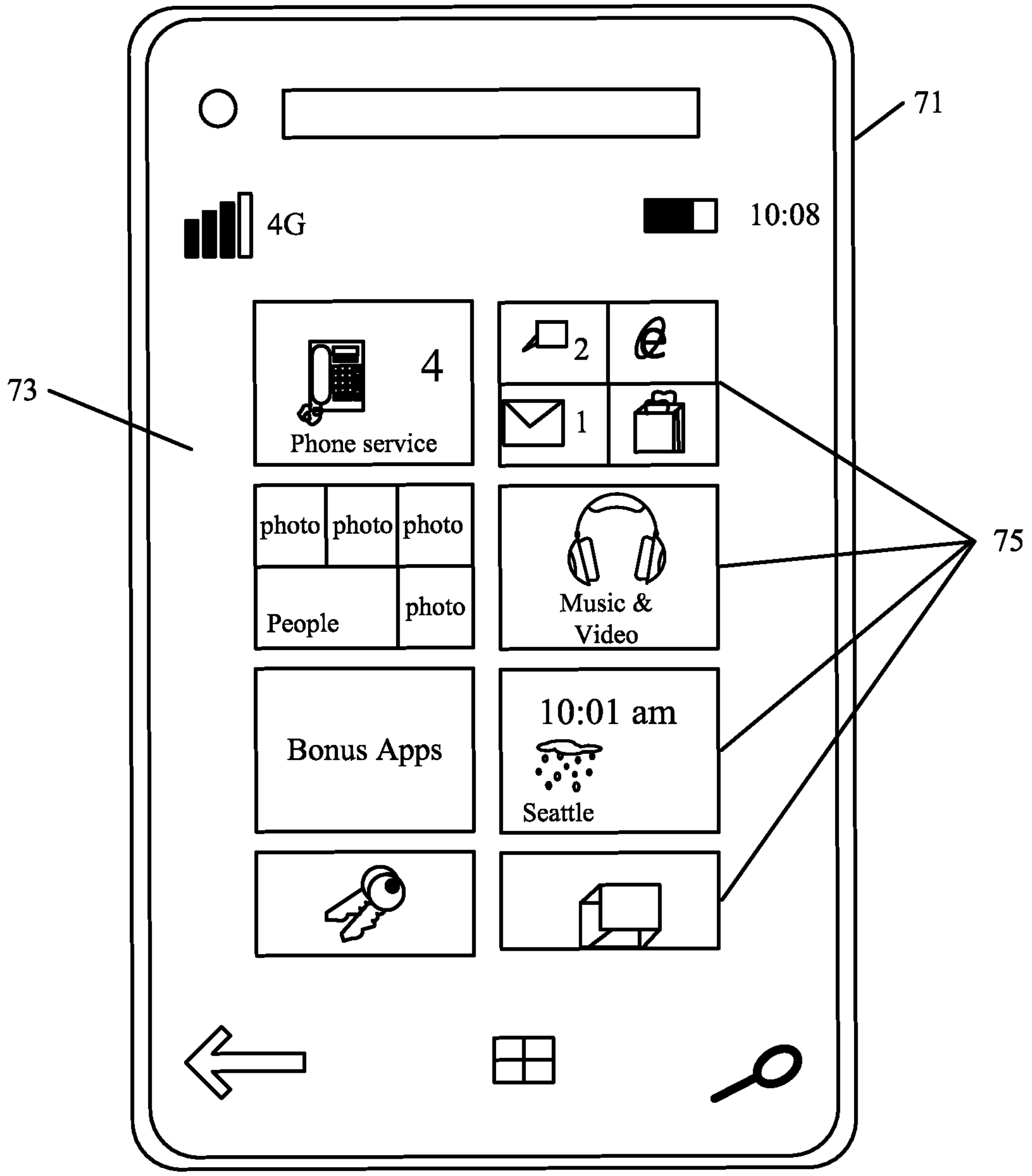

FIG. 5 is a simplified block diagram of one illustrative example of a handheld or mobile computing device that can be used as a user's or client's hand held device 16, in which the present system (or parts of it) can be deployed. For instance, a mobile device can be deployed in the operator compartment of harvester 102 for use in generating, processing, or displaying the slip status data. FIGS. 5-7 are examples of handheld or mobile devices.

FIG. 5 provides a general block diagram of the components of a client device 16 that can run some components shown in previous FIGS., that interacts with the components, or both. In the device 16, a communications link 13 is provided that allows the handheld device to communicate with other computing devices and under some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from previous FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. Location system 27 can include, for instance, a global positioning system (GPS) receiver, a LORAN system, a dead reckoning system, a cellular triangulation system, or other positioning system. Location system 27 can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. Memory 21 can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 6 shows one example in which device 16 is a tablet computer 600. In FIG. 6, computer 600 is shown with user interface display screen 602. Screen 602 can be a touch screen or a pen-enabled interface that receives inputs from a pen or stylus. Computer 600 can also use an on-screen virtual keyboard. Of course, computer 600 might also be attached to a keyboard or other user input device through a suitable attachment mechanism, such as a wireless link or USB port, for instance. Computer 600 can also illustratively receive voice inputs as well.

FIG. 7 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 8:
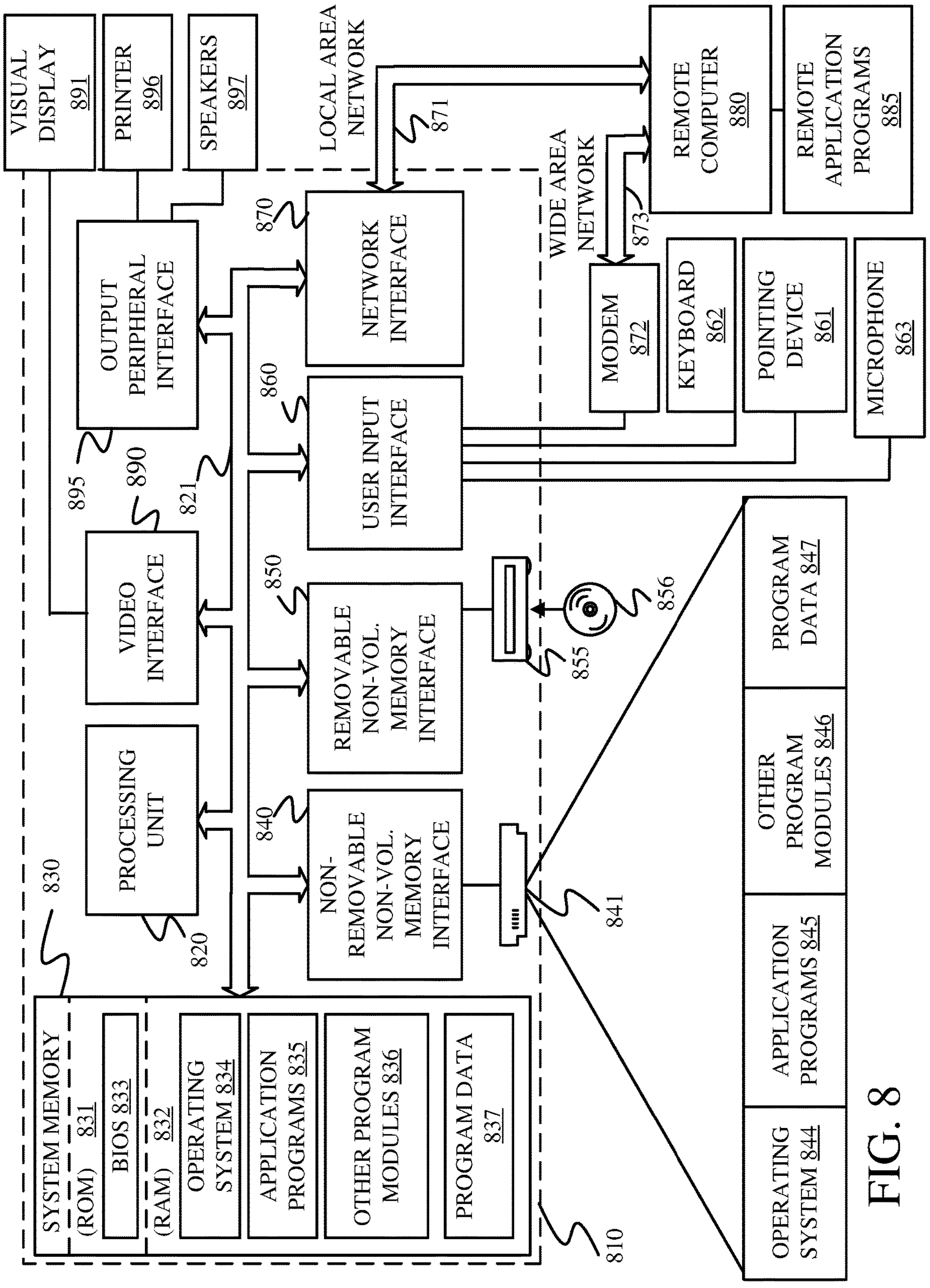
FIG. 8 is a block diagram of a computing environment that can be used in architectures and systems shown in other figures.

FIG. 8 is one example of a computing environment in which elements of previous FIGS., or parts of it, (for example) can be deployed. With reference to FIG. 8, an example system for implementing some embodiments includes a computing device in the form of a computer 810 programmed to operate as described above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to previous FIGS. can be deployed in corresponding portions of FIG. 8.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. Computer storage media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable volatile/nonvolatile computer storage media. By way of example only, FIG. 8 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These input devices and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network-CAN, local area network-LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 8 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method, comprising:

receiving a sensor signal from a vibration sensor mounted on a frame of an agricultural header of an agricultural machine that has a drive shaft that transmits power to a row unit through a slip clutch;

converting the sensor signal to a digital signal;

applying a bandpass filter to the digital signal to obtain a filtered signal;

demodulating the filtered signal to obtain a demodulated signal;

transforming the demodulated signal to a frequency domain signal;

obtaining an input frequency indicative of a frequency at which vibrations are induced on the frame of the agricultural header when the slip clutch is slipping;

comparing a power of the frequency domain signal, within a range of the input frequency, to a threshold power value to obtain a comparison result;

generating a slip status output indicative of whether the slip clutch is slipping based on the comparison result;

detecting a characteristic of engagement of the drive shaft;

determining validity of the slip status output based on the characteristic of engagement of the drive shaft; and generating a control signal to control the agricultural machine based on the validity of the slip status output.

2. The computer implemented method of claim 1 wherein obtaining an input frequency comprises:

sensing a speed of rotation of the drive shaft; and computing the input frequency based on the sensed speed of rotation of the drive shaft.

3. The computer implemented method of claim 2 wherein obtaining an input frequency comprises:

obtaining a slip clutch configuration indicative of a configuration of the slip clutch; and computing the input frequency based on the configuration of the slip clutch.

4. The computer implemented method of claim 3 wherein obtaining a slip clutch configuration comprises:

obtaining a physical configuration of the slip clutch, the physical configuration determining a rate at which vibrations are induced on the frame when the slip clutch is slipping, given a frequency of rotation of the drive shaft.

5. The computer implemented method of claim 3 wherein the drive shaft transmits power to the row unit through a gear assembly having a gear ratio and wherein obtaining an input frequency comprises:

computing the input frequency based on the gear ratio of the gear assembly.

6. The computer implemented method of claim 1 wherein obtaining an input frequency comprises:

obtaining an expected range of frequencies of rotation of the drive shaft; and computing a set of input frequencies based on the expected range of frequencies of rotation of the drive shaft.

7. The computer implemented method of claim 6 wherein comparing a power of the frequency domain signal to a threshold power value to obtain a comparison result comprises:

comparing a power of the frequency domain signal, within a range of the set of input frequencies, to a threshold power value to obtain the comparison result.

8. The computer implemented method of claim 1 wherein generating a control signal comprises:

generating the control signal to control an operator interface based on the slip status output.

9. The computer implemented method of claim 1 wherein generating a control signal comprises:

generating the control signal to control header functionality or harvester functionality based on the slip status output.

10. The computer implemented method of claim 1 and further comprising:

identifying the slip clutch that is slipping based on the power of the frequency domain signal.

11. An agricultural system, comprising:

an agricultural harvester;

a header coupled to the agricultural harvester, the header having a frame, a drive shaft, a plurality of row units, and a plurality of slip clutches, the drive shaft being configured to transmit power to each row unit, of the plurality of row units, through a separate slip clutch, of the plurality of slip clutches;

a vibration sensor mounted on the frame of the header, configured to generate a sensor signal indicative of sensed vibrations;

a signal processing system configured to convert the sensor signal to a digital signal, bandpass filter the digital signal to obtain a filtered signal, demodulate the filtered signal to obtain a demodulated signal, and transform the demodulated signal to a frequency domain signal;

an input frequency calculation processor configured to obtain an input frequency indicative of a frequency at which vibrations occur on the frame of the header when a slip clutch, of the plurality of slip clutches, is slipping, wherein the input frequency calculation processor is configured to automatically adjust the input frequency by determining whether a frequency of rotation of the drive shaft is sensed;

a threshold comparison processor configured to compare a power of the frequency domain signal, within a range of the input frequency, to a threshold power value to obtain a comparison result, wherein the threshold comparison processor is configured to automatically adjust the threshold power value based on whether the frequency of rotation of the drive shaft is sensed; and a slip status output system configured to generate a slip status output indicative of whether the slip clutch, of the plurality of slip clutches, is slipping based on the comparison result.

12. The agricultural system of claim 11 and further comprising:

a drive shaft speed sensor configured to sense a speed of rotation of the drive shaft, the input frequency calculation processor being configured to compute the input frequency based on the sensed speed of rotation of the drive shaft.

13. The agricultural system of claim 12 wherein the input frequency calculation processor is configured to obtain a slip clutch configuration indicator indicative of a configuration of the slip clutch and compute the input frequency based on the configuration of the slip clutch.

14. The agricultural system of claim 13 wherein the slip clutch, of the plurality of slip clutches, has a physical configuration that determines a rate at which vibrations are produced on the frame when the slip clutch is slipping, given a frequency of rotation of the drive shaft, and wherein the input frequency calculation processor is configured to compute the input frequency based on the physical configuration of the slip clutch.

15. The agricultural system of claim 13 and further comprising:

a gear assembly, having a gear ratio, coupled to transmit power from the drive shaft to the row unit, the input frequency calculation processor being configured to compute the input frequency based on the gear ratio of the gear assembly.

16. The agricultural system of claim 11 and further comprising:

an interlock processor configured to determine a validity of the slip status output based on a validity criterion; and a control signal generator configured to generate a control signal based on the validity of the slip status output.

17. An agricultural system, comprising:

an agricultural harvester;

a header coupled to the agricultural harvester, the header having a frame, a drive shaft, a plurality of row units, and a plurality of slip clutches, the drive shaft being configured to transmit power to each row unit, of the plurality of row units, through a separate slip clutch, of the plurality of slip clutches;

a vibration sensor mounted on the frame of the header, configured to generate a sensor signal indicative of sensed vibrations;

a signal processing system configured to convert the sensor signal to a digital signal, bandpass filter the digital signal to obtain a filtered signal, demodulate the filtered signal to obtain a demodulated signal, and transform the demodulated signal to a frequency domain signal;

a slip detection system configured to generate a slip status output indicative of whether the separate slip clutch, of the plurality of slip clutches, is slipping based on the frequency domain signal; and a control signal generator configured to generate a control signal to control header functionality or harvester functionality based on the slip status output.

18. The agricultural system of claim 17, wherein the slip detection system is configured to:

detect a characteristic of engagement of the drive shaft;

determine validity of the slip status output based on the characteristic of engagement of the drive shaft; and generate a control signal based on the validity of the slip status output.

19. The agricultural system of claim 17, wherein the slip detection system is configured to automatically adjust an input frequency by determining whether a frequency of rotation of the drive shaft is sensed, and to automatically adjust a threshold power value based on whether the frequency of rotation of the drive shaft is sensed.

20. The agricultural system of claim 17, wherein the slip detection system is configured to:

determine validity of the slip status output based on a validity criterion; and generate a control signal based on the validity of the slip status output.

* * * * *